United States Patent [19]
Hofmann et al.

[11] Patent Number: 5,704,597
[45] Date of Patent: Jan. 6, 1998

[54] RADIAL BEARING AND TROUBLE SUPPORT HAVING THE RADIAL BEARING

[75] Inventors: Manfred Hofmann, Hünfelden; Kai Brauer, Selters; Thomas Gentner, Waghäusel, all of Germany

[73] Assignee: Metzeler Gimetall AG, Breuberg, Germany

[21] Appl. No.: 661,347

[22] Filed: Jun. 14, 1996

[30] Foreign Application Priority Data

Jun. 16, 1995 [DE] Germany .................. 195 21 967.8

[51] Int. Cl.[6] ........................................... F16F 7/00
[52] U.S. Cl. .......................... 267/140.12; 267/140.3; 267/141.4; 267/293
[58] Field of Search .................... 267/140.12, 141, 267/140.3, 140.5, 141.2–141.4, 152, 153, 292, 293; 248/562, 636

[56] References Cited

U.S. PATENT DOCUMENTS

| | | | |
|---|---|---|---|
| 4,871,152 | 10/1989 | Funahashi | 267/140.12 |
| 4,953,833 | 9/1990 | Schmidt et al. | 267/140.12 |
| 5,489,087 | 2/1996 | Bitschkus | 267/141 |

FOREIGN PATENT DOCUMENTS

| | | | |
|---|---|---|---|
| 4026370 | 3/1992 | Germany | 267/140.12 |
| 63-176844 | 7/1988 | Japan | 267/140.12 |
| 2-159438 | 6/1990 | Japan | 267/140.12 |

*Primary Examiner*—Peter M. Poon
*Attorney, Agent, or Firm*—Herbert L. Lerner; Laurence A. Greenberg

[57] ABSTRACT

A radial bearing, particularly for a torque support in motor vehicle engines, includes an outer sleeve and an inner sleeve which is coaxial with the outer sleeve and is constructed as a bush core. The inner sleeve is provided on its outer periphery with at least one radially orientated elastomeric body and at least one rubber end stop. The rubber end stop is active only after a predeterminable spring deflection of the elastomeric body. The inner sleeve also has two mutually opposite elastic carrying bodies, through which the inner sleeve is elastically mounted on the outer sleeve. If there is a radial introduction of force, three linear characteristic curve ranges with different rigidity are present one after the other.

16 Claims, 3 Drawing Sheets

5,704,597

1

RADIAL BEARING AND TROUBLE SUPPORT HAVING THE RADIAL BEARING

BACKGROUND OF THE INVENTION

FIELD OF THE INVENTION

The invention relates to a radial bearing, particularly for a torque support in motor vehicle engines, having an outer sleeve, an inner sleeve which is coaxial with the outer sleeve and is constructed as a bush core, as well as at least one radially orientated elastomeric body with axially orientated hollow ducts and at least one rubber end stop which operates after a predeterminable spring deflection of the elastomeric body, being disposed in a clear space between the inner sleeve and the outer sleeve.

Such a radial bearing is known from German Patent 40 25 284, corresponding to U.S. Pat. No. 5,489,087, having the same assignee as the instant application. In the known radial bearing, a cylindrical outer sleeve and a coaxial inner sleeve are provided, and two elastomeric bodies which have an interval between them are disposed in an annular gap between the outer and the inner sleeves. In each case, the elastomeric bodies have hollow ducts extending in the axial direction. An annular rubber end stop is mounted on the inner sleeve between the two elastomeric bodies. When radial loading of the radial bearing occurs, the two elastomeric bodies are first of all pressed together. Under those circumstances, variation of the rigidity, both in the radial and in the axial direction, is possible as a result of the disposition and construction of the hollow ducts provided in the elastomeric bodies.

In the case of torque roll engine-mounting systems, the weight of the engine in a so-called "torque roll axis" is absorbed by two bearings. The torques that occur lead to rolling movements of the engine which are cushioned by so-called "torque supports". Bearings of that kind are supposed to be very soft for small agitations. However, those bearings must also be capable of absorbing very high forces for supporting the torque that occurs.

SUMMARY OF THE INVENTION

It is accordingly an object of the invention to provide a radial bearing and a torque support having the radial bearing, which overcomes the hereinafore-mentioned disadvantages of the heretofore-known devices of this general type and with the aid of which at least three linear characteristic curve ranges of different rigidities can be produced.

With the foregoing and other objects in view there is provided, in accordance with the invention, a radial bearing, particularly for a torque support in motor vehicle engines, comprising an outer sleeve; an inner sleeve being constructed as a bush core, having an outer periphery, being coaxial with the outer sleeve and defining a clear space between the inner sleeve and the outer sleeve; at least one radially orientated elastomeric body being disposed in the clear space and having axially orientated hollow ducts formed therein; at least one rubber end stop being disposed in the clear space and operating after a predeterminable spring deflection of the at least one elastomeric body; and at least two mutually opposite elastic carrying bodies retaining the outer periphery of the inner sleeve relative to the outer sleeve; the elastic carrying bodies, the at least one elastomeric body and the at least one rubber end stop having different rigidities, for operating the elastic carrying bodies, the at least one elastomeric body and the at least one rubber end stop one after the other upon increasing force.

2

In the radial bearing according to the invention, the elastic carrying bodies fitted at the outer periphery of the inner sleeve give rise to an initial range of the characteristic curve with low rigidity. Under these circumstances, the carrying bodies can be pretensioned during assembly, so that the shearing rigidity that occurs can be reduced again. The life span of the component can be considerably improved as a result of this pretensioning. If there is a greater introduction of force, the spring rigidity of the at least one elastomeric body is critical. This has a higher rigidity than the initial range of the characteristic curve, and it is possible to vary the rigidity through the use of the hollow ducts which are inserted in the at least one elastomeric body and extend in the axial direction. Under these circumstances, hollow ducts which are variable in cross-section may also be present. Finally, when the force increases further, the rubber end stop comes into contact with the outer sleeve, under which circumstances the rigidity of the rubber end stop is critical for the characteristic curve. An essential advantage of the radial bearing according to the invention lies in the fact that great possibilities for variation exist with a construction which is the same in principle, as a result of which a broad field of use opens up.

In accordance with another feature of the invention, there are provided two elastomeric bodies which have an interval between them, the rubber end stop being disposed between the elastomeric bodies.

In accordance with a further feature of the invention, the at least one elastomeric body has oppositely located regions between which the inner sleeve is received.

In accordance with an added feature of the invention, the at least one elastomeric body and/or the regions thereof are disposed in such a way as to be offset in the peripheral direction in relation to the carrying bodies, and form an angle, in particular a 90° angle, with the carrying body.

In accordance with an additional feature of the invention, the at least one elastomeric body is secured in position on the inner sleeve, and the outer periphery of the at least one elastomeric body delimits a gap ($S_1$) in conjunction with the outer sleeve. Thus the elastomeric body comes into operation only after the gap has been surmounted.

In accordance with yet another feature of the invention, the rubber end stop is provided on a metal bead which projects radially from the inner sleeve. An elastic rubber layer is then applied to the metal bead, for example by vulcanisation.

In accordance with yet a further feature of the invention, the rubber end stop delimits a second gap in conjunction with the outer sleeve, and the second gap is greater than the first gap between the elastomeric body and the outer sleeve. Thus the rubber end stop operates only after the gap second has been surmounted.

In accordance with yet an added feature of the invention, the hollow ducts of the at least one elastomeric body have a cross-section which is variable in the axial direction. The elastomeric body may, for example, have hollow ducts in accordance with German Patent 40 25 284, corresponding to U.S. Pat. No. 5,489,087, which has the same assignee as the instant application.

In accordance with yet an additional feature of the invention, there is provided an inner part which encompasses the inner sleeve, the elastomeric bodies which are disposed thereon and have an interval between them, the intervening rubber end stop and the carrying bodies which are mounted on the outer surface of the inner sleeve, the carrying bodies are disposed so as to be offset in the peripheral direction in relation to the elastomeric bodies and are provided with end plates on their outer surfaces, and the inner part is capable of being secured in position on the outer sleeve. An inner part of this kind is then introduced into the outer sleeve during assembly of the radial bearing and secured in position on the latter, in the process of which pretensioning of the carrying body receiving the inner sleeve takes place.

With the objects of the invention in view there is also provided a torque support, particularly for a torque roll engine mounting in motor vehicles, with a radial bearing as described above. It is particularly advantageous for this type of application if a very soft characteristic curve and only slight rigidity is present in the initial range. Nevertheless, a torque support of this kind is also capable of absorbing high forces when torques occur. In all, the torque support according to the invention has three different characteristic curve ranges with increasing spring rigidity, which are present in dependence upon the spring deflection.

Other features which are considered as characteristic for the invention are set forth in the appended claims.

Although the invention is illustrated and described herein as embodied in a radial bearing and a torque support having the radial bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
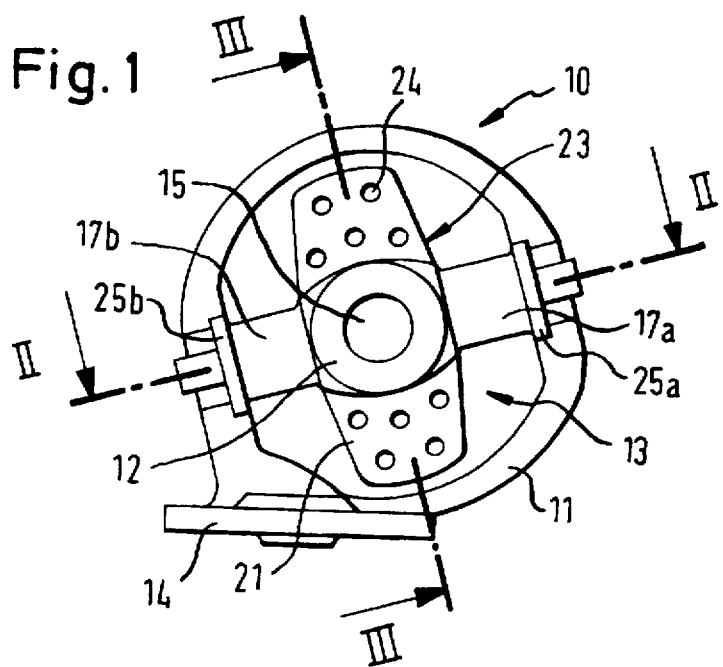
FIG. 1 is a diagrammatic, side-elevational view of a radial bearing according to the invention.

Referring now to the figures of the drawings in detail and first, particularly, to FIG. 1 thereof, there is seen a radial bearing which is constructed as a torque support 10. The torque support 10 is used in torque roll engine-mounting systems in which a vehicle engine is received, in a so-called torque roll axis, by two bearings and the torques are cushioned by torque supports.

Figure 2:
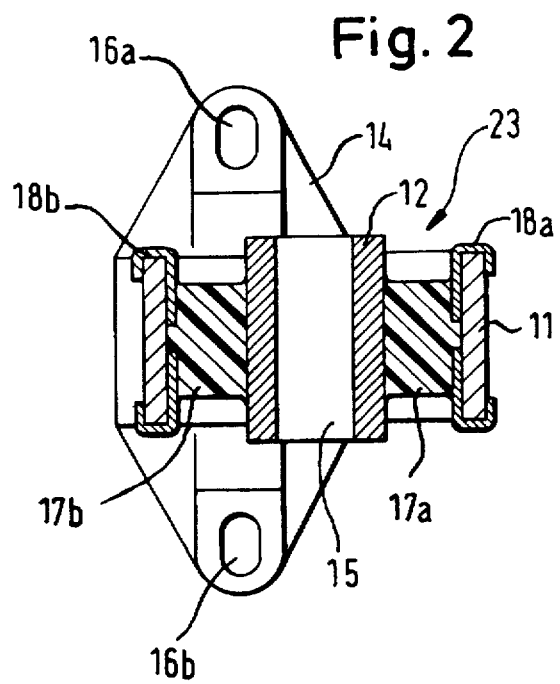
FIG. 2 is a sectional view taken along a line II—II of FIG. 1, in the direction of the arrows.
Figure 3:
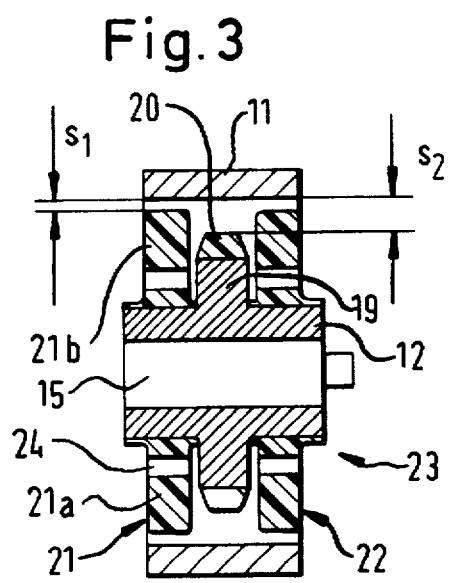
FIG. 3 is a sectional view taken along a line III—III of FIG. 1, in the direction of the arrows.
Figure 4:
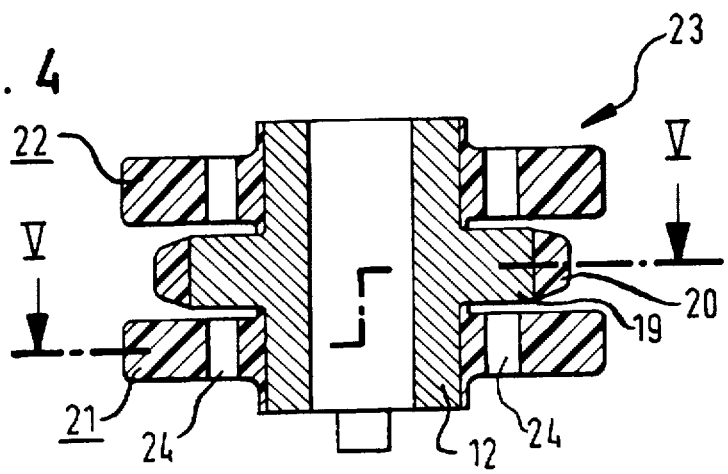
FIG. 4 is an axial-sectional view through an inner part of the radial bearing illustrated in FIG. 1.
Figure 5:
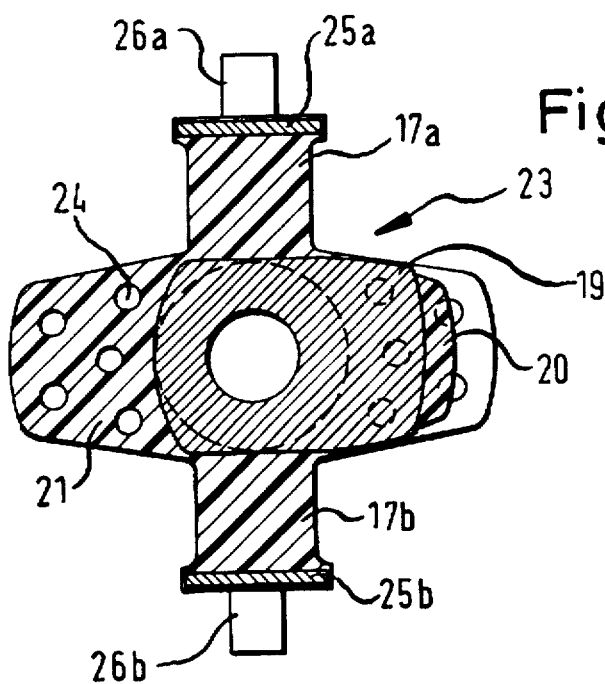
FIG. 5 is a sectional view taken along a line V—V of FIG. 4, in the direction of the arrows.
Figure 6:
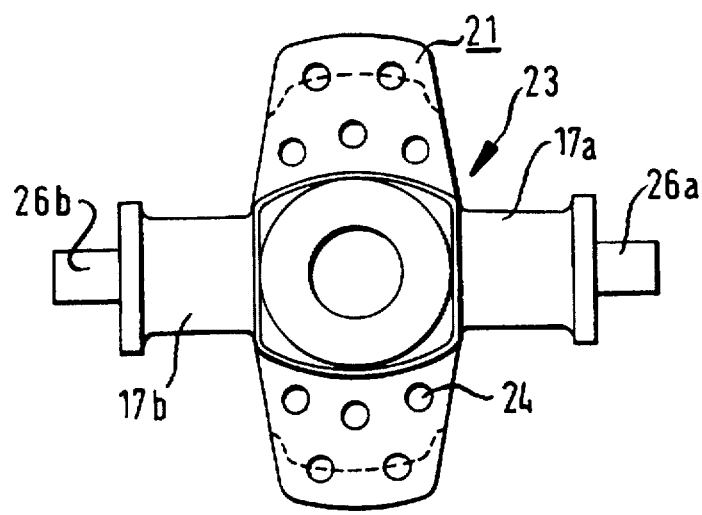
FIG. 6 is an individual representation of an inner part of the radial bearing illustrated in FIG. 1.

As is evident from FIGS. 1 to 3, the torque support 10 has an outer sleeve 11 which projects perpendicularly from a fastening part 14. Two fastening holes 16a, 16b are provided on the fastening part 14 for securing the torque support in position on a vehicle body, which is not represented. The outer sleeve 11 delimits a clear space 13, in which an inner part 23, that is built up from several components, is received. FIGS. 4 to 6 show different views of the inner part 23. The inner part 23 has an inner sleeve 12 which, in the installed condition, is disposed in such a way as to be coaxial with the outer sleeve 11 and which is provided with an inner bore 15.

As can be seen particularly clearly from FIGS. 3 and 4, two elastomeric bodies 21, 22, which have an interval between them, are received on the outer periphery of the inner sleeve 12. Each of the elastomeric bodies 21, 22 has two oppositely located regions 21a, 22b, so that the inner sleeve 12 is disposed in an intervening manner. Hollow ducts 24 extending in the axial direction are inserted in the elastomeric bodies 21, 22. The rigidity of the elastomeric bodies 21, 22 can be varied through the use of the hollow ducts 24. The hollow ducts may have a cross-sectional path that differs in the axial direction.

A rubber end stop 20, which is mounted on the outer periphery of a metal bead 19 projecting radially from the inner sleeve 12, is provided between the elastomeric bodies 21, 22.

As is evident from FIG. 3, the elastomeric bodies 21, 22, in conjunction with the outer sleeve 11, delimit a gap $S_1$. The outer sleeve 11, in conjunction with the rubber end stop 20, which is disposed in an intervening manner, delimits a gap $S_2$ which is substantially greater than the gap $S_1$.

The inner sleeve 12 is further provided with two carrying bodies 17a, 17b which, in the peripheral direction, form a 90° angle with the elastomeric bodies 21, 22. As is evident from FIG. 5, which shows a section along a line V—V in FIG. 4, the elastic carrying bodies have end plates 25a, 25b at their ends. A fastening bolt 26a, 26b which projects vertically from the end plates 25a, 25b in each case, serves to secure the inner part 23 in position on the outer sleeve 11.

The components that essentially constitute the inner part 23 are also evident from the view illustrated in FIG. 6.

During assembly of the torque support 10, the inner part 23, which has been manufactured complete, is introduced into corresponding receptacles on the outer sleeve 11. In order to secure the inner part 23 in position, fastening clips 18a, 18b which are provided on the carrying bodies 17a, 17b are wrapped around the outer sleeve 11 in a form-locking manner. A form-locking connection is one which connects two elements together due to the shape of the elements themselves, as opposed to a force-locking connection, which locks the elements together by force external to the elements. As a result of this structure, it is possible for the torque support 10 to be dismantled again in a simple manner. The carrying bodies 17a, 17b are pretensioned during assembly, as a result of which rigidity can again be reduced.

Figure 7:
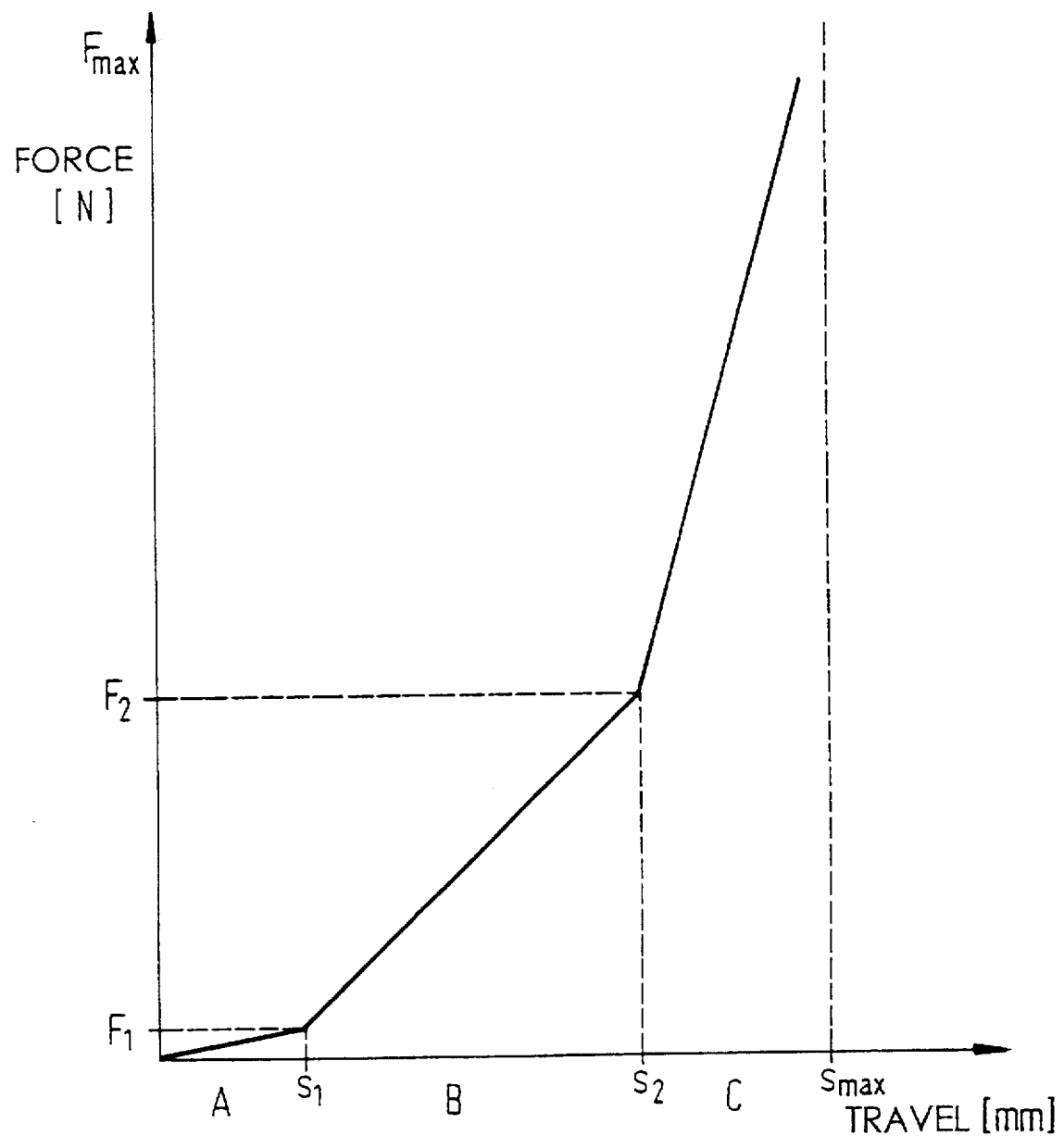
FIG. 7 is a diagram showing a force/travel characteristic curve of the radial bearing illustrated in FIG. 1.

The way in which the torque support 10 functions is explained in greater detail below with reference to FIG. 7, which shows a force/travel characteristic curve.

In an initial range A, the force/travel characteristic curve is determined by the rigidity of the carrying bodies 17a, 17b. In this initial range A, the torque support 10 is structured in such a way as to be very soft and has only very slight rigidity. In this way, small agitations, such as those which occur during idling, can be isolated in a satisfactory manner. In this initial range A, the elastomeric bodies 21, 22 are inoperative, since the gap $S_1$ has not yet been surmounted. It is only in the event of greater forces occurring that the spring deflection is so great that the gap $S_1$ is surmounted. In such an intermediate range B, the force/travel characteristic curve is increased by the rigidity of the elastomeric bodies 21, 22. In this way, the rigidity in the intermediate range B is determined by the carrying bodies 17a, 17b and the elastomeric bodies 21, 22. As is evident from FIG. 7, there is greater rigidity in this intermediate range B. The rigidity can be varied to a wide extent through the use of the hollow ducts 24 provided in the elastomeric bodies 21, 22. In the event of greater forces occurring, the gap $S_2$ is also surmounted so that the spring rigidity of the rubber end stop 20 for the torque support is then also operative and is added to the rigidity existing in the intermediate range B. There is therefore high rigidity in an end region C, as can be seen from FIG. 7.

As a result of the series connection of the elastic carrying bodies 17a, 17b, the elastomer bodies 21, 22 and the rubber end stop 20, a torque support 10 is thus provided which has three different ranges A, B and C, that extend in a linear manner in each case and have different rigidities. As a result of this structure, it is possible on one hand, to satisfactorily isolate the small agitations that occur, in particular during idling, whereas on the other hand, it is also possible to absorb the very great forces connected with the torques that are introduced.

We claim:

1. A radial bearing, comprising:
   an outer sleeve;
   an inner sleeve being constructed as a bush core, having an outer periphery, being coaxial with said outer sleeve and defining a clear space between said inner sleeve and said outer sleeve;
   at least one radially orientated elastomeric body being disposed in said clear space and having axially orientated hollow ducts formed therein;
   at least one rubber end stop being disposed in said clear space and operating after a predeterminable spring deflection of said at least one elastomeric body; and
   at least two mutually opposite elastic carrying bodies retaining said outer periphery of said inner sleeve relative to said outer sleeve;
   said elastic carrying bodies, said at least one elastomeric body and said at least one rubber end stop having different rigidities, for operating said elastic carrying bodies, said at least one elastomeric body and said at least one rubber end stop one after the other upon increasing force.

2. The radial bearing according to claim 1, wherein said at least one elastomeric body is two elastomeric bodies having an interval therebetween in which said at least one rubber end stop is disposed.

3. The radial bearing according to claim 2, including an inner part to be secured in position on said outer sleeve, said inner part encompassing said inner sleeve, said elastomeric bodies on said inner sleeve, said at least one intervening rubber end stop and said at least one carrying body mounted on an outer surface of said inner sleeve, said carrying bodies being offset in peripheral direction relative to said elastomeric bodies, and said carrying bodies having outer surfaces with end plates.

4. The radial bearing according to claim 1, wherein said at least one elastomeric body has oppositely located regions between which said inner sleeve is received.

5. The radial bearing according to claim 4, wherein said regions of said at least one elastomeric body are offset in a peripheral direction relative to said carrying bodies, forming an angle with said carrying bodies.

6. The radial bearing according to claim 5, wherein said angle is a 90° angle.

7. The radial bearing according to claim 4, wherein said at least one elastomeric body and said regions of said at least one elastomeric body are offset in a peripheral direction relative to said carrying bodies, forming an angle with said carrying bodies.

8. The radial bearing according to claim 7, wherein said angle is a 90° angle.

9. The radial bearing according to claim 1, wherein said at least one elastomeric body is offset in a peripheral direction relative to said carrying bodies, forming an angle with said carrying bodies.

10. The radial bearing according to claim 9, wherein said angle is a 90° angle.

11. The radial bearing according to claim 1, wherein said at least one elastomeric body is secured in position on said inner sleeve, and said at least one elastomeric body has an outer periphery delimiting a given gap in conjunction with said outer sleeve.

12. The radial bearing according to claim 11, wherein said at least one rubber end stop delimits a gap in conjunction with said outer sleeve, and said gap being greater than said given gap.

13. The radial bearing according to claim 1, including a metal bead projecting radially from said inner sleeve, said at least one rubber end stop being disposed on said metal bead.

14. The radial bearing according to claim 1, wherein said hollow ducts in said at least one elastomeric body have a cross-section being varied in axial direction.

15. A torque support, comprising:
    a radial bearing including:
    an outer sleeve;
    an inner sleeve being constructed as a bush core, having an outer periphery, being coaxial with said outer sleeve and defining a clear space between said inner sleeve and said outer sleeve;
    at least one radially orientated elastomeric body being disposed in said clear space and having axially orientated hollow ducts formed therein;
    at least one rubber end stop being disposed in said clear space and operating after a predeterminable spring deflection of said at least one elastomeric body; and
    at least two mutually opposite elastic carrying bodies retaining said outer periphery of said inner sleeve relative to said outer sleeve;
    said elastic carrying bodies, said at least one elastomeric body and said at least one rubber end stop having different rigidities, for operating said elastic carrying bodies, said at least one elastomeric body and said at least one rubber end stop one after the other upon increasing force.

16. A torque support for a torque roll engine mounting in motor vehicles, comprising:
    a radial bearing including:
    an outer sleeve;
    an inner sleeve being constructed as a bush core, having an outer periphery, being coaxial with said outer sleeve and defining a clear space between said inner sleeve and said outer sleeve;
    at least one radially orientated elastomeric body being disposed in said clear space and having axially orientated hollow ducts formed therein;
    at least one rubber end stop being disposed in said clear space and operating after a predeterminable spring deflection of said at least one elastomeric body; and
    at least two mutually opposite elastic carrying bodies retaining said outer periphery of said inner sleeve relative to said outer sleeve;
    said elastic carrying bodies, said at least one elastomeric body and said at least one rubber end stop having different rigidities, for operating said elastic carrying bodies, said at least one elastomeric body and said at least one rubber end stop one after the other upon increasing force.

* * * * *

UNITED STATES PATENT AND TRADEMARK OFFICE
CERTIFICATE OF CORRECTION

PATENT NO.   : 5,704,597
DATED        : January 6, 1998
INVENTOR(S)  : Manfred Hofmann et al.

It is certified that error appears in the above-identified patent and that said Letters Patent is hereby corrected as shown below:

ON THE TITLE PAGE:

Item [54] and in Col. 1, line 1, the Title should read:

RADIAL BEARING AND TORQUE SUPPORT HAVING THE RADIAL BEARING

Signed and Sealed this

Twelfth Day of May, 1998

Attest:

BRUCE LEHMAN

Attesting Officer

Commissioner of Patents and Trademarks